United States Patent [19]

Minekawa et al.

[11] 3,980,624

[45] Sept. 14, 1976

[54] PROCESS FOR PRODUCING RUBBERY POLYMERS AND COPOLYMERS HAVING BRANCHED STRUCTURES

[75] Inventors: Saburo Minekawa; Sigeru Yonekawa; Haruro Tabata, all of Yokohama; Takashi Ishida, Kamakura; Satoshi Tsuchida, Yokohama; Kiyoshi Yamada, Kawasaki, all of Japan

[73] Assignee: Asahi Kasei Kogyo Kabushiki Kaisha, Osaka, Japan

[22] Filed: Mar. 14, 1974

[21] Appl. No.: 451,281

Related U.S. Application Data

[63] Continuation of Ser. No. 267,682, June 29, 1972, abandoned, continuation of Ser. No. 52,057, July 2, 1970, abandoned, and a continuation-in-part of Ser. No. 689,139, Dec. 8, 1967, abandoned.

[30] Foreign Application Priority Data

Dec. 16, 1966 Japan.............................. 41-82030

[52] U.S. Cl................................ 526/173; 526/340; 526/73
[51] Int. Cl.².................. C08F 236/10; C08F 136/06
[58] Field of Search...................... 260/94.2 M, 83.7

[56] References Cited

UNITED STATES PATENTS

| | | | |
|---|---|---|---|
| 2,975,160 | 3/1961 | Zelinski | 260/83.7 |
| 3,030,346 | 4/1962 | Cooper | 260/83.7 |
| 3,213,075 | 10/1965 | Sonnenfeld | 260/94.2 M |
| 3,361,730 | 1/1968 | Naylor | 260/94.2 M |
| 3,464,961 | 9/1969 | Foster | 260/94.2 M |

*Primary Examiner*—Paul R. Michl
*Attorney, Agent, or Firm*—Flynn & Frishauf

[57] ABSTRACT

A polymerization process for producing rubbery polymers or random copolymers having excellent physical properties as well as good processability, and completely freed from a flow at normal temperature. The process, which may be called as "Low-temperature Pretreatment Polymerization process," comprises polymerizing conjugated dienes or copolymerizing conjugated dienes and monovinyl substituted aromatic compound under a specific polymerization conditions in the presence of an alkyllithium catalyst to produce a polymer or random copolymer of the desirably controlled structure of branches to afford such excellent properties mentioned above.

14 Claims, 4 Drawing Figures

PROCESS FOR PRODUCING RUBBERY POLYMERS AND COPOLYMERS HAVING BRANCHED STRUCTURES

CROSS-REFERENCE TO RELATED APPLICATION

This is a continuation of application Ser. No. 267,682, filed June 29, 1972 now abandoned, a continuation of Ser. No. 52,057 filed July 2, 1970 now abandoned, and a Continuation-in-Part Application of our U.S. Pat. Application Ser. No. 689,139 filed Dec. 8, 1967, now abandoned.

BACKGROUND OF THE INVENTION

1. Field of the Invention

This invention relates to a process for producing rubbery polymers and random copolymers having branched structures from which improved physical properties are brought about.

2. Description of the Prior Art

In recent years, the rubbery polymers obtained by using an alkyllithium catalyst are gaining more and more important position in the field of vulcanized rubber since they normally have quite excellent performances such as the abrasion resistance, low temperature characteristics, flex-cracking resistance, dynamic properties, etc.

However, these rubbery polymers obtained by using the organolithium catalyst are known heretofore to have practically perfect linear structures, lacking completely the branched structures in their molecules, as described in Industrial and Engineering Chemistry, Johnson, B. L., 40, 351 (1948), Journal of Polymer Science, Part C, No. 1, p. 311 (1963) and Part A, No. 2, p. 797 (1964). Thus, they have drawbacks in that their flow properties at room temperature or so-called "cold flow," are extremely high, and that the tensile strength and tear resistance of the unvulcanized rubber are poor due to the less entanglement among the molecules.

Because of these drawbacks as mentioned above, there have been often involved some difficulties in the processing operations of these rubbery polymers prior to the vulcanization thereof and, as a result, the utility of these rubbery polymers known heretofore has been greatly restricted in spite of the excellent performances belonging to them.

Heretofore, in order to prevent the flow properties at room temperature, there have been proposed a number of methods which may be generally classified into the following three groups:

1. Methods of giving chemical cross-linking among the rubber molecules by the incorporation of a cross-linking agent having polyfunctional group, as disclosed in Dutch Pat. No. 6,602,265.
2. Methods of giving cross-linking among the rubber molecules by using a radical generating reagent as described in the specification of British Pat. No. 1,018,364.
3. Methods of preventing the cold flow by blending of a different type of polymer as disclosed in U.S. Pat. Nos. 3,244,773 and 3,240,841.

However, the methods for preventing the cold flow proposed heretofore based on these conceptions as generally classified into the above-mentioned three groups are inevitably accompanied by the deterioration in the performances of the rubbery polymers and, sometimes, an extreme degradation in the processability.

SUMMARY OF THE INVENTION

It is, accordingly, an object of this invention to provide a novel polymerization process which enables the production of rubbery polymers having improved performances and processability, and prevented from the cold flow, overcoming the problems mentioned above involved in the methods for preventing the cold flow known heretofore.

The object of this invention mentioned above can now be accomplished by the process of this invention which comprises subjecting a conjugated diene or a mixture of a conjugated diene and a monovinyl substituted aromatic compound to a low temperature condition within a temperature range of from $-5°C$. to $25°C$. in the presence of an alkyllithium catalyst in a hydrocarbon diluent to initiate the reaction, maintaining the mixture at the temperature ($-5°C$. $- 25°C$) for a predetermined period of time, in general, from 1 to 5 hours, with the conversion of monomer in this pretreating reaction being not higher than 15%, and thereafter subjecting the resulting reaction mixture to a further polymerization reaction employing a conventional polymerization temperature ($40°C - 120°C$.) to complete the reaction, thereby giving a polymer or random copolymer having desired branched structures.

That is, the process of this invention is essentially different from those prior art methods adopted heretofore for the prevention of the cold flow. In accordance with this invention, there is obtained a rubbery polymer or random copolymer having a desired degree of branching in the polymeric chain which, in turn, affords the polymer or random copolymer remarkable improvements in the tensile strength and the tear resistance under an unvulcanized condition, and in the processability as well, while completely prevented from the cold flow.

The "Low-temperature Pretreatment Polymerization Process" of this invention is characterized in that a monomer or monomers, a catalyst and a hydrocarbon solvent are mixed and retained fro a considerably prolonged period of time under reaction conditions including an extremely low temperature which has been considered insignificant from a commercial point of view and thus has never been used heretofore, and thereafter, the reaction mixture is subjected to the conventional polymerization temperature condition known heretofore to complete the polymerization reaction.

The product yielded from such specific polymerization conditions is a rubbery polymer and random copolymer having branched structures.

Now, the essential meaning of the process of this invention will be explained in detail in conjunction with the accompanying drawings in which.

The explanation will be given by making reference to the polymerization of 1,3-butadiene in the presence of n-butyllithium catalyst.

Figure 1:
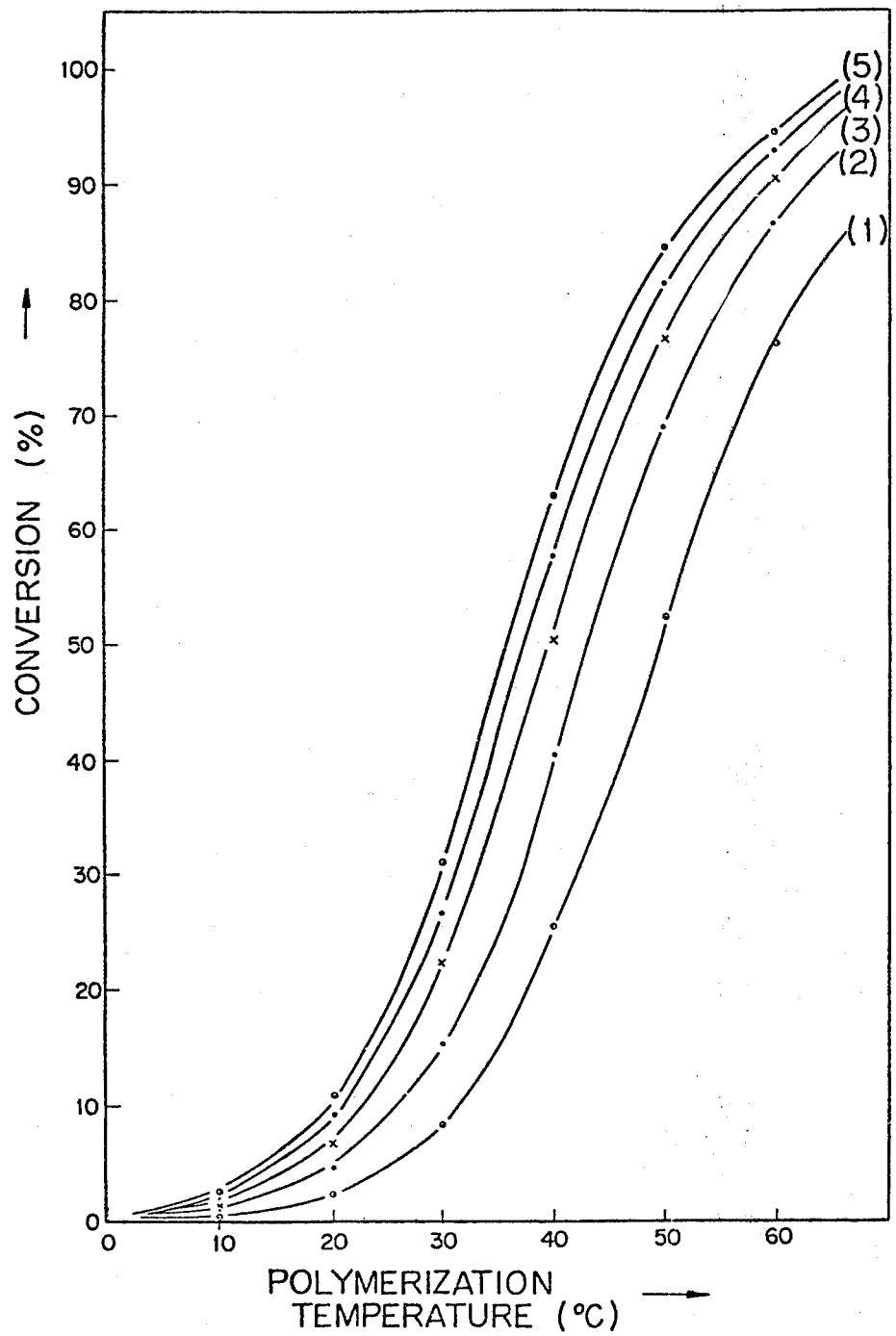
FIG. 1 illustrates the relationships between the polymerization temperatures and the conversions of 1,3-butadiene at various polymerization periods as parameter in the polymerization of 1,3-butadiene in the presence of n-butyllithium.

In FIG. 1, the relationship between the polymerization temperature and the conversion of 1,3-butadiene is diagrammed by using the polymerization period as a parameter. In FIG. 1, the curves (1), (2), (3), (4), and (5) show the polymerization periods of 1 hour, 2 hours, 3 hours, 4 hours and 5 hours, respectively.

As can be noted from the FIG. 1, at the polymerization temperature of below about 20°C, the conversion of the monomer hardly exceeds 10% even if the polymerization period of 5 hours is used. Thus, such low temperature region has been disregarded completely as an insignificant temperature region from a commercial point of view.

We have investigated a series of products of low degree of polymerization which are obtained by retaining monomers and catalysts for a prolonged period of time in such low temperature region in which the polymerization propagation velocity is extremely suppressed. As a result, we have found that a lithium content in such products is extraordinarily high. For example, an analysis of a low molecular polymer obtained under the polymerization conditions including a reaction temperature of 15°C. and a reaction period of 5 hours revealed that the polymer contained 2 to 6 lithium atoms per polymeric molecule having the number average molecular weight calculated from the conversion of the monomer.

This indicates that the polymerization propagation velocity and the polymerization initiation velocity are extremely suppressed at such a low temperature, and, as a result, the concentration of the unreacted catalyst is kept relatively high in the reaction mixture and this unreacted catalyst not only participates in the polymerization initiation reaction but also has a possibility of being added on methylene or unsaturated group of the low molecular polymer. Thus, it has been found that the low molecular polymer obtained after the prolonged contacting time of 5 hours at the reaction temperature of 15°C. has shorter polymeric chains due to the fact that the polymerization propagation velocity has been extremely suppressed, but it has active centers in a comparatively high density within the polymeric chain.

It has further been found that a rubbery polymer produced by subjecting such low molecular polymer having a number of active centers to a conventional polymerization conditions including a temperature of 40°– 120°C. and completing the polymerization reaction at that temperature shows very high value of the Williams recover and no flow at room temperature, presumably due to the face that the propagation reactions are proceeded at the respective active centers in the polymeric chains.

In practising the process of this invention, an important factor is that the density of the active centers can be optionally controlled by the pretreating temperature, pretreating period and pretreating conversion, thus, the value of the Williams recovery of the rubbery polymer obtained in the subsequent process wherein the polymerization of the pretreated polymer is completed under the conventional polymerization condition can also be controlled optionally by the combination of the pretreating temperature and period.

Figure 2:
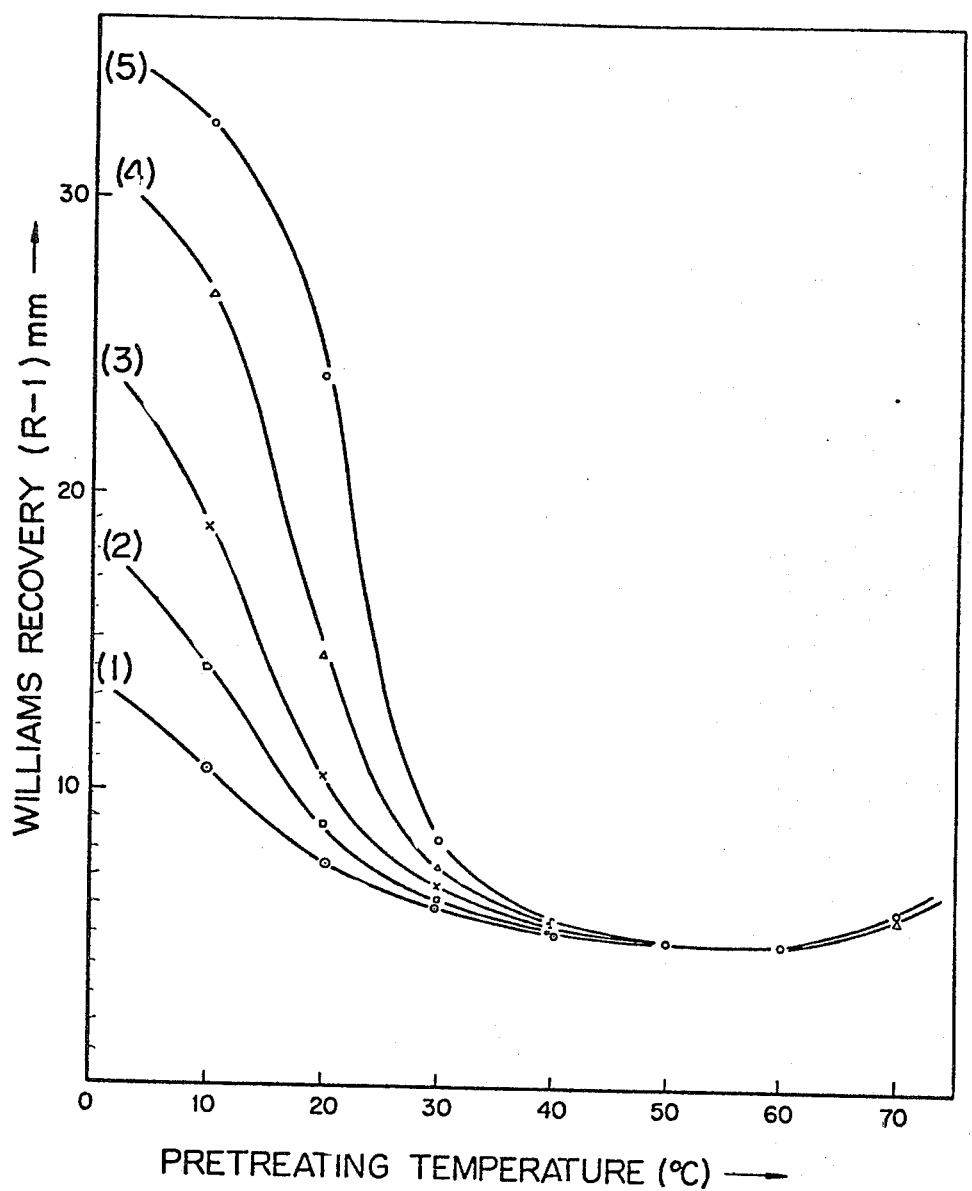
FIG. 2 shows the relationship between the pretreating temperature and the Williams recovery of the resulting product at various polymerization periods as parameter.

FIG. 2 shows the relationships of the pretreating temperature and period of a mixture consisting of a monomer, a catalyst and a hydrocarbon solvent to the value of the Williams recovery of the resulting rubbery polymer obtained by the subsequent polymerization under the conventional polymerization temperature condition.

In FIG. 2, the curves (1), (2), (3), (4) and (5) show the pretreating periods of 1 hour, 2 hours, 3 hours, 4 hours and 5 hours, respectively.

As can be noted from the FIG. 2, it is clear that a pretreatment reaction at a temperature as low as possible and necessarily below 25°C. and a prolonged period of time of at least 60 minutes is effective in order to obtain a rubbery polymer having a sufficiently branched structure. FIG. 2 clearly shows that the temperature range of 40°– 80°C. commonly used heretofore affords only a straight chain polymer of which branched structure is extremely suppressed.

In the process of this invention, the pretreating temperature is restricted to a range of −5°C. to +25°C. because of the fact that the temperatures lower than −5°C. require a considerably prolonged pretreating period which is of course undesirable from a commercial point of view, and at temperatures above +25°C., the polymerization propagation velocity becomes greater than the polymerization initiation velocity.

As seen from Example 2, FIGS. 1 and 2, when the conversions of monomers exceed 15%, flow property of the resulting rubbery polymer or random copolymer is adversely influenced and in that case, therefore, the object of the present invention cannot be accomplished.

Alkyllithium catalysts which may be used in the process of this invention preferably include methyllithium, ethyllithium, propyllithium, n-butyllithium, amyllithium, hexyllithium, 2-ethylhexyllithium, sec-butyllithium and the like.

The amount of the catalyst required depends upon the type of the polymer contemplated. However, in general, the amount is practically the same as that of the catalyst required in the reaction at the temperatures employed heretofore.

Conjugated dienes which may be used in the process of this invention include 1,3-butadiene, 2-methyl-1,3-butadiene (isoprene) and 1,3-pentadiene (piperylene).

Monovinyl substituted aromatic hydrocarbons which may be copolymerized with the conjugated dienes according to this invention include styrene, 3-vinyltoluene, 4-ethylstyrene, 4-vinyltoluene and the like.

Diluents which may be used in the process of this invention are paraffinic, cycloparaffinic and aromatic hydrocarbons, and the typical examples of these diluents include pentane, hexane, isobutane, isooctane, n-dodecane, cyclopentane, cyclohexane, methylcyclohexane, benzene, toluene, xylene, ethylbenzene and the like. These diluents exemplified above may be used either alone or in admixture of two or more kinds.

Conjugated diene rubbery polymer or conjugated diene/monovinyl substituted aromatics rubbery random copolymer obtained by the polymerization in the presence of these alkyllithium catalyst in the hydrocarbon diluent according to this invention is mixed with an antioxidant such as phenylnaphthylamine, then separated from the diluent, and dried to yield the desired product according to the conventional method.

In the polymerization reaction of this invention, the polymer completely free from gel may be produced continuously in a conversion of nearly 100% based on the conjugated diene charged.

Now, there will be explained hereinafter the remarkable effect of this invention that the rubbery polymers or random copolymers having optionally controlled branched structures according to this invention possess an excellent processability and exhibit no flow property at room temperature, i.e., cold flow.

Figure 3:
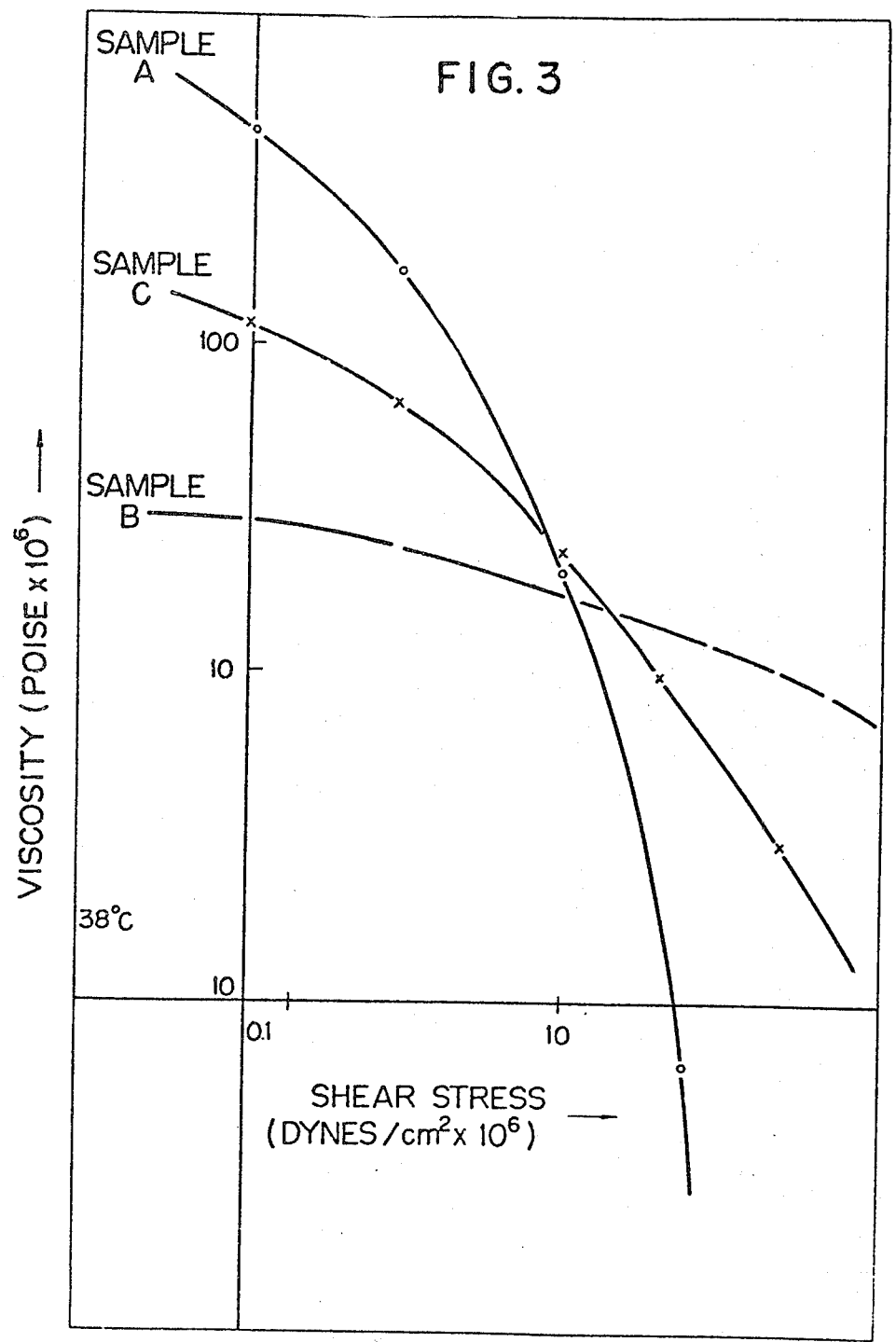
FIG. 3 shows the relationship between the shear stress and the viscosity of various samples of polybutadiene.

FIG. 3 shows the curves obtained by plotting the viscosity values at the different shear stress of three samples, i.e., polybutadiene sample (A) obtained according to the process of this invention, polybutadiene comparative sample (B) having the same composition as that of the sample (A) but obtained according to the conventional process, wherein the cold flow is not improved, and polybutadiene comparative sample (C) of which cold flow is prevented according to the conventional process, i.e. by using divinylbenzene.

The preparation of these samples will be explained in detail in Example 1 hereinafter. Generally speaking, in order that a rubbery polymer has a sufficiently high resistance to the cold flow and exhibits an excellent processability, the polymer is required to have sufficiently great resistance to prevent the flow at lower shear stress, i.e. external force, but sufficiently high flow property to give an excellent processability at a greater shear stress. Namely, it is required to show a non-Newtonian physical properties in which the resistance is variable depending upon the extent of the stress exerted.

As can be noted from FIG. 3, it is clear that the comparative sample (C) of which cold flow is improved by the chemical cross-linking has a large viscosity value at a low shear stress and the viscosity value is firmly retained even when the shear stress exerted on the sample is increased. This, clearly, is the cause of degradation in the processability of the rubbery polymer of which cold flow is prevented by the chemical cross-linking. Similar tendency can be clearly observed with regard to a group of samples of which cold flows were prevented by the radical cross-linking.

In the polybutadiene comparative sample (B) having relatively straight-chain structure which is prepared according to the conventional polymerization process known heretofore without giving any particular consideration to the prevention of cold flow, it is shown that the viscosity value is sufficiently low to cause the flowing of polymer at a small shear stress, and the viscosity value remains unchanged at a greater shear stress, i.e., the processability is not improved.

On the other hand, the polybutadiene sample (A) which is polymerized according to the process of this invention shows a larger viscosity value than that of the comparative sample (C) at a small shear stress, indicating that the cold flow can be prevented perfectly, while its viscosity value can be decreased even lower than that of the comparative sample (B) at a greater shear stress, indicating clearly that it has an excellent processability.

It is crystal clear that the feature of the rheological properties of the sample (A) has its basis on the macrostructure of the polymer, particularly the branched structure characteristic of the polymer. That is, the rubbery polymer obtained according to the process of this invention shows the non-Newtonian rheological properties as illustrated in FIG. 3 because of the fact that it has the branched structure which may be accurately controlled by the polymerization conditions.

The method of producing the branched structures on a polymeric chain according to the process of this invention is entirely novel and essentially different from the methods known heretofore involving, for example, the chemical cross-linking, radical cross-linking, blending of different type of polymers or the addition reaction. Therefore, in accordance with this invention, there are brought about a number of advantages over these prior art processes from the commercial viewpoint as enumerated in the following:

1. Since no chemical cross-linking agent or radical cross-linking agent is used, a continuous operation for a prolonged period of time is possible without accompanying a gelation in the manufacturing process.

2. The cold flow can be perfectly prevented even in an oil extended rubbery polymers or random copolymers.

3. One of the particularly unique properties of the present rubbery polymer or random copolymers is an excellent roll processability, and, as a result, there are brought about remarkable effects such as the lowering in the temperature of tight banding to roll mill, improvement in the compatibility with fillers and vulcanizing agents and the resulting shortened mixing time.

4. Because of the excellent compatibility, the resulting compounds have superior performance. Particularly, they are excellent in the abrasion resistance and the flex-cracking resistance.

Although these are the major effects of the rubbery polymers or random copolymers obtained according to the process of this invention, there are other appendant effects such as the simplified storing and packing equipments, and the easy handling and transportation, which are by no means of least importance.

DESCRIPTION OF THE PREFERRED EMBODIMENTS

This invention will be explained more fully and practically in the following Examples.

It should not be construed, however, that these Examples restrict this invention as they are given merely by way of illustration.

EXAMPLE 1

To an autoclave provided with a jacket which was cooled at 10°C. was charged a mixed solution consisting of 25 parts by weight of 1,3-butadiene and 75 parts by weight of n-hexane, which was cooled at 10°C. There was further added dropwise 5% n-hexane solution containing 0.0125 part by weight of n-butyllithium which was sufficiently cooled. The temperature of the autoclave was raised from 10°C. up to 11°C. in the meantime. Thereafter, the reaction mixture was stirred at the low temperature of 11°C. for 5 hours until the conversion of 1,3-butadiene reached 4.3%, then, the temperature of the jacket was raised gradually until the temperature of the autoclave reached 70°C. within the next 4 hours. At the end of the period, to the reaction mixture was added 0.25 part by weight of 2,6-di-tert-butyl-p-cresol per 100 parts by weight of polybutadiene and the reaction was terminated. The conversion of 1,3-butadiene was 99.72%. The resulting polymer solution was dried by a heated drum dryer to give polybutadiene as a sample (A).

For comparison, to a reactor trains was supplied continuously a mixed solution consisting of 100 parts by weight of 1,3-butadiene, 300 parts by weight of n-hexane and 0.050 part by weight of n-butyllithium and the polymerization reaction was conducted continuously first at 40°C. for 2.2 hours, second at 45°C. for 2.2 hours, third at 50°C. for 2.2 hours, fourth at 60°C. for 2.2 hours and last at 70°C. for 2.2 hours. After the addition of 0.25 part by weight of 2,6-di-tert-butyl-p-cresol to 100 parts by weight of polybutadiene at the outlet of the equipment, the resulting polymer solution was supplied to a dryer to yield dried polybutadiene as a comparative sample (B). The conversion of 1,3-butadiene was 99.80%.

For further comparison, a polymer was obtained as a comparative sample (C) by using the same equipment and the same composition of the mixture as in the preparation of the comparative sample (B) except that 0.25 part by weight of divinyl benzene per 100 parts by weight of 1,3-butadiene was added. The conversions of 1,3-butadiene and divinylbenzene were 99.75% and 95.6%, respectively.

The following Table 1 shows the Mooney viscosity, the flow property and the mill processability of the samples (A), (B) and (C).

Table 1

| Item | Samples | | |
|---|---|---|---|
| | (A) | (B) | (C) |
| (1) $ML_{1+4}$ (100°C.) | 34.5 | 34.0 | 35.5 |
| (2) Y-3 (mm) | 4.15 | 1.50 | 3.45 |
| (3) R-1 (mm) | 3.25 | 0.18 | 2.25 |
| (4) Flow test (mg/min) | 0.3 | 7.5 | 0.4 |
| (5) Flowing rate (mm/min) | | | |
| 25°C. | 0.06 | 0.52 | 0.09 |
| 60°C. | 0.10 | 1.20 | 0.13 |
| (6) Minimum temperature of tight banding to roll mill (°C.) | 48 | 80 | 106 |

In the above Table:
(1) Measured according to JIS-K-63000
(2) Williams Plasticity (ASTM D-926)
(3) Williams Recovery (ASTM D-926)
(4) Extruding rate from an orfice of 0.6 cm² at 100°C. under a pressure of 250 g/cm².
(5) Rate of deformation of a sample of cylindrical shape having 2 cm. diameter and 3 cm. height, placed on an inclined plane at 45° in a thermostat maintained at a predetermined temperaure.
(6) Minimum surface temperature required for the sample to band to roll mills smoothly by using 8" diameter roll mills under operating conditions including a revolving ratio of 1 : 1.4 and a roll clearance of 5.0 mm.

As can be clearly noted from the Table 1, the sample (A) is far superior in all flow tests to the comparative sample (B), in spite of the fact that they have the same Mooney viscosities. Although the comparative sample (C) shows satisfactory performances comparable to those of the sample (A) in the flow tests, it is even worse than the comparative sample (B) in the mill processability, showing the sample (A) to be quite excellent in this regard.

The samples (A), (B) and (C) were respectively compounded according to a recipe shown in Table 2. The compatibility, the flow properties, extrusion property, and the green strength of the unvulcanized compounds thus obtained are given in the following Table 3:

Table 2

| RECIPE | |
|---|---|
| | Parts by weight |
| Polybutadiene sample | 100 |
| HAF carbon black | 50 |
| Aromatic process oil | 10 |
| Stearic acid | 1 |

Table 2-continued

| RECIPE | |
|---|---|
| | Parts by weight |
| Zinc oxide | 3 |
| Antioxidant D* | 1 |
| Vulcanization accelerator CZ** | 1 |
| Sulfur | 1.8 |

*Trade name, phenyl-β-naphthylamine.
**Trade name, N-cyclohexylbenzothiazyl sulfeamide.

Table 3

| Item | Samples | | |
|---|---|---|---|
| | (A) | (B) | (C) |
| (1) Mixing time required (min) | 27 | 40 | 62 |
| (2) Flow rate test (mm/min), 70°C. | 0.07 | 1.25 | 0.14 |
| (3) Extrusion characteristics | | | |
| A) Rate of extrusion (cc/min) | 8.1 | 7.4 | 6.3 |
| B) Die swelling (%) | 38 | 32 | 50 |
| C) Evaluation of extrudate appearance | 4 | 2 | 1 |
| (4) Green strength of compound (kg/cm²) | 3.6 | 1.9 | 2.2 |

(1) An open roll was used and the operating temperature was 80°C.
(2) Same as (5) in Table 1.
(3) Brabender-type extruder of the following specification was used:
Screw dimension: 15 mm × 90 mm
Screw rotation: 20 r.p.m.
Extruding orfice size: 2.0 mm.
The extruding temperature was 90°C. The extrudate appearance was evaluated by giving 4 points to a satisfactory surface.
(4) Values shown were obtained by applying the measuring method according to JIS-K-6301 to the unvulcanized samples.

As can be noted from Table 3, the sample (A) obtained according to the process of this invention require very short mixing period, and moreover, the flow property, extrusion property, particularly the evaluation of the extrudate appearance, as well as the green strength are far superior to those of the comparative samples (B) and (C).

The following Table 4 shows the physical properties of these three different samples as measured after vulcanizing them at 140°C. for 30 minutes by hot press:

Table 4

| Item | Samples | | |
|---|---|---|---|
| | (A) | (B) | (C) |
| Tensile strength (kg/cm²)* | 146 | 130 | 133 |
| 300% tensile modulus (kg/cm²)* | 70 | 66 | 72 |
| Elongation (%)* | 480 | 490 | 420 |
| Tear resistance (kg/cm)* | 42 | 35 | 35 |
| Hardness (Hs JIS)* | 63 | 62 | 64 |
| Resilience by RUPKE resilience tester (%)* | 60 | 60 | 61 |
| Akron abrasion (cc/1000 times)** | 0.04 | 0.06 | 0.08 |
| Flex-cracking Demattia tester (times)*** | 2630 | 2010 | 2250 |

*Measured according to JIS-6301.
**Revolution 250 r.p.m., Slipping angle 15°, Load 4.5 Kg.
***Measured according to ASTM-D-813-59.

From the results shown in Table 4, it is clearly noted that the sample (A) obtained according to the process of this invention have excellent physical properties including the fundamental properties such as the tensile strength and the tear resistance.

EXAMPLE 2

The samples (A-1), (A-2), (A-3) and (A-4) and (A-7) were prepared according to the same procedures as in the preparation of the sample (A) in Example 1 except that the pretreating temperatures and the pretreating periods were varied. The sample (A-2) in the instant Example is the same as the sample (A) in Example 1.

The Mooney viscosity and the flow property of these four samples are shown in the following Table 5:

ple (E) except that 0.25 part by weight of divinylbenzene was added to the starting solution. The conversions of 1,3-butadiene, styrene and divinylbenzene in the instant case were 99.88%, 99.70% and 95.60%, respectively.

The physical properties and the flow properties of these samples (D), (E) and (F) thus obtained are Table 5

| Item | Sample | | | | | | |
|---|---|---|---|---|---|---|---|
| | A-1 | A-2 | A-3 | A-4 | A-5 | A-6 | A-7 |
| Pretreating temperature (°C) | 10 | 10 | 20 | 20 | 24 | 20 | 20 |
| Pretreating period (hrs.) | 3 | 5 | 3 | 5 | 5 | 15 | 25 |
| Pretreating conversion (%) | 2.0 | 2.5 | 7.0 | 9.0 | 15.0 | 27.0 | 40.0 |
| $ML_{1+4}$ (100°C.) | 34.0 | 34.5 | 33.5 | 34.5 | 32.5 | 30.5 | 28.0 |
| Y-3 (mm) | 3.00 | 4.15 | 2.30 | 3.50 | 2.75 | 2.10 | 1.70 |
| R-1 (mm) | 1.88 | 3.25 | 1.05 | 2.40 | 1.35 | 0.65 | 0.45 |
| Microstructure (%): | | | | | | | |
| Cis | 33.9 | 33.1 | 34.2 | 33.4 | 34.0 | 36.0 | 35.4 |
| Trans | 51.8 | 52.7 | 51.6 | 52.6 | 51.5 | 52.1 | 52.5 |
| Vinyl | 14.3 | 14.2 | 14.2 | 14.0 | 14.5 | 11.9 | 12.1 |
| Flow Test (mg/min.) | 0.75 | 0.30 | 1.60 | 0.50 | 1.10 | 3.20 | 5.5 |
| Flow rate (mm/min.) | | | | | | | |
| 25°C. | 0.13 | 0.06 | 0.16 | 0.08 | 0.14 | 0.29 | 0.43 |
| 60°C. | 0.18 | 0.10 | 0.19 | 0.12 | 0.18 | 0.40 | 1.05 |

These measurings were performed according to the same methods as those explained in Table 1 under (1) – (5).

It will be understood from Table 5 that polymers having desired degree of branching, i.e., the desired flow property, can be produced by controlling the pretreated temperature, pretreating period and pretreating conversion.

EXAMPLE 3

To an autoclave was charged a solution containing 3.8 parts by weight of 1,3-butadiene, 18 parts by weight of styrene, 87.2 parts by weight of n-hexane and 0.068 part by weight of sec-butyllithium and the pretreatment reaction was carried out for 5 hours while maintaining the temperature at 5°C. At the end of the period, the conversions of 1,3-butadiene and styrene were 3.2% and 0.5%, respectively. A sample (D) was obtained by subjecting the resulting reaction mixture to a polymerization reaction under the same conditions as employed in the preparation of a comparative sample (E) described hereinafter.

In the preparation of the sample (E), a polymerization reaction was started by charging a solution containing 3.8 parts by weight of 1,3-butadiene, 18 parts by weight of styrene, 87.2 parts by weight of n-hexane and 0.068 part by weight of sec-butyllithium to an autoclave. The reaction was conducted first at 60°C. for 2 hours, second at 70°C. for 6 hours and last at 75°C. for an hour.

Since 1,3-butadiene having a higher rate of reaction than styrene was consumed more quickly than styrene as the reaction proceeded, a solution containing 78.2 parts by weight of 1,3-butadiene and 312.8 parts by weight of n-hexane was added to the reaction mixture portionwise in order to maintain the concentration of 1,3-butadiene in the reaction mixture at a fixed level. After a lapse of 30 minutes from the completion of the addition, to the reaction mixture was added 0.25 by weight of 2,6-di-tert-butyl-p-cresol per 100 parts by weight of polymer and the reaction was terminated. The conversions of 1,3-butadiene and styrene were 99.80% and 99.72%, respectively. The resulting solution was dried by a heated drum dryer to give a polymer as a sample (E).

A sample (F) was obtained according to the same procedures as described in the preparation of the samshown in the following Table 6:

Table 6

| Item | Samples | | |
|---|---|---|---|
| | (D) | (E) | (F) |
| $ML_{1+4}$(100°C.) | 46.0 | 46.5 | 45.0 |
| Amount of bound styrene* (% by weight) | 18.0 | 18.0 | 17.9 |
| Amount of block styrene** (% by weight) | 0.05 | 0.06 | 0.04 |
| Y-3 (mm) | 4.30 | 1.90 | 4.05 |
| R-1 (mm) | 3.75 | 0.38 | 3.00 |
| Flow test (mg/min) | 0.30 | 8.5 | 0.6 |
| Flow rate (mm/min) | | | |
| 25°C. | 0.11 | 0.88 | 0.15 |
| 60°C. | 0.28 | 2.05 | 1.05 |

*Measured by Abbe refractometer.
**Determined by an oxidative decomposition method using di-tert-butyl-hydroperoxide and osmium tetroxide.
Other measuring were performed according to the methods set forth in Table 1.

As can be clearly noted from the Table 6, the sample (D) is far superior in all flow tests to the comparative sample (E), in spite of the fact that they have the same Mooney viscosities. Moreover, when comparing with the sample (F) which was obtained by using the chemical cross-linking agent, the sample (D) is superior to the sample (F) with respect to the flow rate at a high temperature.

These three different samples (D), (E) and (F) were respectively compounded according to a recipe shown in Table 7 to give corresponding samples of unvulcanized compounds and the results of tests performed with regard to their extrusion properties are shown in Table 8:

Table 7

| RECIPE | |
|---|---|
| | Parts by weight |
| Butadiene/styrene copolymer | 100 |
| HAF carbon black | 60 |
| Aromatic process oil | 20 |
| Stearic acid | 1 |
| Zinc oxide | 3 |
| Antioxidant D | 1 |
| Vulcanization accelerator CZ | 1 |
| Sulfur | 1.8 |

Table 8

| Item | Samples | | |
|---|---|---|---|
| | (D) | (E) | (F) |
| Mooney viscosity (ML$_{1+4}$100°C.) | 57.0 | 54.0 | 57.0 |
| Rate of extrusion (cc/min) | 8.8 | 7.6 | 7.0 |
| Die swelling (%) | 36 | 30 | 50 |
| Evaluation of extrudate appearance* | 4 | 4 | 2 |
| Mixing time required in a Bunbury mixer (min) | 6.5 | 7.3 | 8.2 |

*Evaluated by giving 4 points to a satisfactory surface.
In the above tests, the mixing was carried out at 120°C by using a Bunbury mixer, and the extrusion was conducted at 90°C by using a Brabendar-type extruder of the following specification:
Screw dimension: 15 mm$\phi$ × 90 mm Screw rotation: 20 r.p.m. Extruding orifice size: 2.0 mm Extruding temperature: 90°C As can be noted from Table 8, the sample (D) obtained according to the process of this invention requires very short mixing time in a Bunbury mixer indicating that it has an excellent compatibility. It further shows that the sample (D) has far superior extrusion properties, i.e., the rate of extrusion and the extrudate appearance to those of the sample (F).

The following Table 9 shows the physical properties of these three different samples as measured after vulcanizing them at 140°C. for 30 minutes.

Table 9

| Item | Samples | | |
|---|---|---|---|
| | (D) | (E) | (F) |
| Tensile strength (kg/cm$^2$) | 230 | 205 | 195 |
| 300% tensile modulus (kg/cm$^2$) | 95 | 93 | 98 |
| Elongation (%) | 485 | 485 | 460 |
| Tear resistance (kg/cm) | 40 | 38 | 38 |
| Hardness (Hs JIS) | 60 | 60 | 63 |
| Resilience by RUPKE resilience tester (%) | 58 | 58 | 60 |
| Akron abrasion | 0.04 | 0.04 | 0.09 |

The measurings were performed according to the methods specified in Table 4.

The results shown in the Table 9 clearly indicates that when the flow property is prevented by using a chemical cross-linking agent, there is caused a remarkable degradation in the most fundamental physical property, i.e., tensile strength as observed in the sample (F). In contrast, the sample (D) has excellent tensile strength and tear resistance.

EXAMPLE 4

A solution containing 25 parts by weight of 1,3-butadiene, 75 parts by weight of n-hexane, 0.0055 part by weight of n-butyllithium and 0.2 part by weight of divinylbenzene was subjected to a pretreatment reaction at 10°C. for 5 hours until the conversion of 1,3-butadiene reached 2,3%.

Then, the pretreated mixture was supplied continuously to a polymerization equipment and polymerized continuously first at 40°C. for 2.2 hours, second at 45°C. for 2.2 hours, third at 60°C. for 2.2 hours and last at 70°C. for 2.2 hours. To the reaction mixture were added 0.5 part by weight of 2,6-di-tert-butyl-p-cresol and 50 parts by weight of aromatic process oil having a specific gravity of 1.0035 and V.G.C. (Viscosity Gravity Constant) of 0.9330 per 100 parts by weight of polybutadiene at the outlet of the equipment and after a thorough mixing by agitation, the resulting mixture was supplied to a drum dryer to give an oil extended polymer as a sample (G).

For comparison, to a polymerization equipment was supplied continuously a solution containing 25 part by weight of 1,3-butadiene, 75 parts by weight of n-hexane, 0.0055 part by weight of n-butyllithium and 0.2 part by weight of divinylbenzene, and the polymerization reaction was conducted continuously first at 40°C. for 2.2 hours, second at 45°C. for 2.2 hours, third at 60°C. for 4.4 hours and last at 70°C. for 2.2 hours. Then, the reaction mixture were mixed with 0.5 part by weight of 2,6-di-tert-butyl-p-cresol and 50 parts by weight of an aromatic process oil per 100 parts by weight of polybutadiene at the outlet of the equipment.

After a thorough mixing by agitation, the reaction mixture was fed to a drum dryer and dried to give an oil extended polymer as a sample (H).

Figure 4:
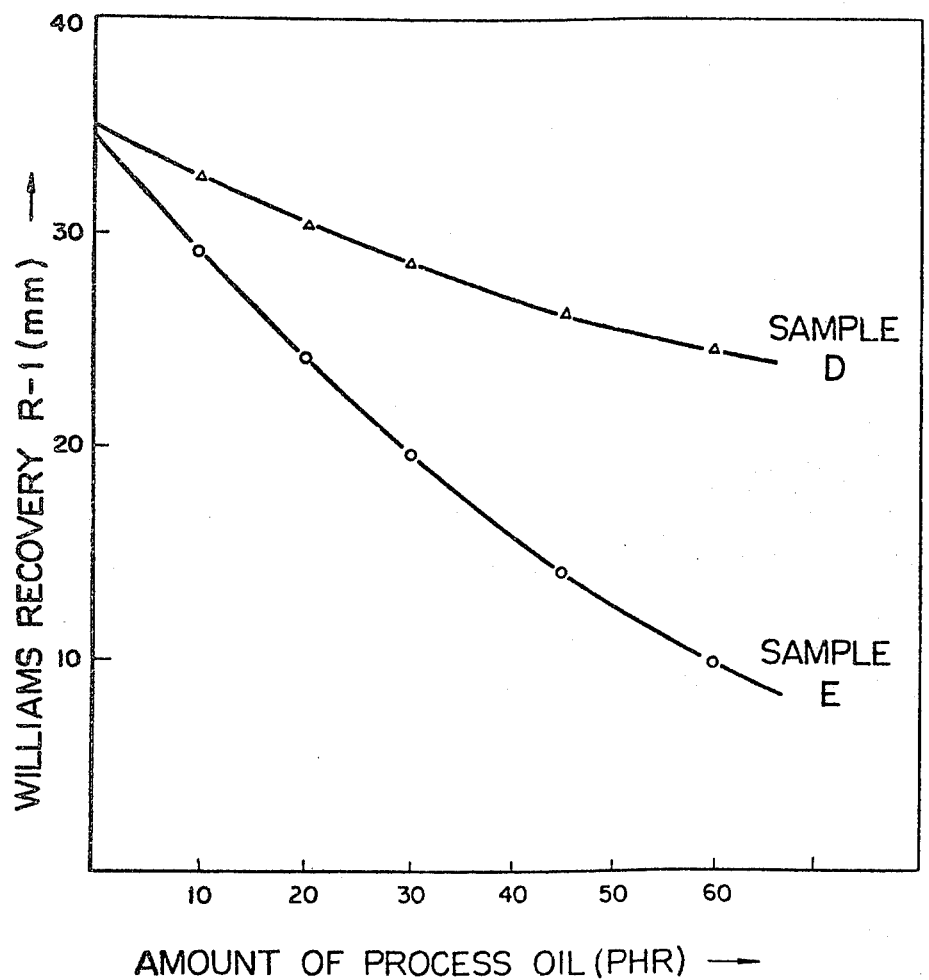
FIG. 4 illustrates the relationship between the amount of process oil added to polybutadiene and the Williams recovery of the resulting oil-extended polybutadiene.

FIG. 4 shows the comparison of the degrees of lowering in the flow resistance at the oil-extending operation between the oil-extended sample (G) obtained according to the process of this invention and the oil-extended sample (H) obtained according to the prior art process.

In FIG. 4, the values of Willims recovery were plotted in order to show the flow resistance.

It can be noted clearly from the FIG. 4 that the effect of the cold flow prevention achieved by the branched structure in accordance with this invention is retained effectively even after the extension with the oil as compared with the prior art process.

The physical properties of these sample (G) and (H) thus obtained as measured before and after the extending with the process oil are shown in the following Table 10:

Table 10

| Item | | Samples | |
|---|---|---|---|
| | | (G) | (H) |
| Before extending with process oil | ML$_{1+4}$(100°C.) | 94.0 | 93.0 |
| | R-1 (mm) | 4.2 | 4.1 |
| | Y-3 (mm) | 4.6 | 4.8 |
| | Gel content (%)* | 0 | 5.3 |
| After extending with process oil | ML$_{1+4}$(100°C.) | 36.0 | 30.5 |
| | R-1 (mm) | 3.5 | 1.6 |
| | Y-3 (mm) | 3.6 | 3.0 |
| | Flow test (mg/min) | 0.7 | 1.6 |

*% by weight of residue obtained by dissolving the samples in toluene and filtering the resulting solution through a 200 mesh sieve. Other tests and measurings were performed according to the methods explained in Table 1.

It can be noted from the Table 10 that the sample (G) is superior to the sample (H) in that the gel content can be made completely zero and that the characteristic of the cold flow prevention is not degraded by the oil extending operation.

The oil extended samples (G) and (H) were then compounded according to the following recipe shown in Table 11 by using a Bunbury mixer and their compatibilities were measured.

The following Table 12 shows the physical properties of the unvulcanized compounded samples, including the green strength and the processability, particularly the extrudability.

Table 11

| RECIPE | |
|---|---|
| | Parts by weight |
| Polybutadiene | 100 |
| HAF carbon black | 60 |
| Zinc oxide | 5.0 |
| Stearic acid | 2.0 |
| Antioxidant C* | 1.0 |
| Antioxidant D | 1.0 |
| Vulcanization accelerator CZ | 1.0 |

Table 11-continued

RECIPE

| | Parts by weight |
|---|---|
| Sulfur | 1.6 |

*Trade name, aldol (α-naphthylamine).

Table 12

| Item | | Samples | |
|---|---|---|---|
| | | (G) | (H) |
| Mixing time in Bunbury mixer (min) | | 7.3 | 9.5 |
| Mooney viscosity $ML_{1+4}(100°C.)$ | | 58 | 61 |
| Green strength (kg/cm²)* | | 4.9 | 3.5 |
| Extrusion properties*** | Extrusion pressure (kg/cm²) | 110 | 120 |
| | Extrudability (g/min) | 1.38 | 1.20 |
| | Evaluation of extrusion*** | 8 | 6 |

*Values obtained by applying the measuring method according to JIS-K-6301 to the unvulcanized samples.
**Extrusion tests were performed by using a Garvey Die tester.
***Evaluated by giving 12 points to a satisfactory extrusion.

The Table 12 clearly indicates that the sample (G) has a better mixing property in a Bunbury mixer, a smaller compounded Mooney viscosity $ML_1{}^+{}_4(100°C.)$, a greater green strength, and a better extrudability as compared with the comparative sample (H). Particularly, the greater green strength affords a remarkable improvement in the processability in the manufacturer of tyre treads.

These two unvulcanized samples were then vulcanized at 140°C. for 50 minutes, and the physical properties of the resulting vulcanized samples were measured. The results are shown in the following Table 13:

Table 13

| Item | Samples | |
|---|---|---|
| | (G) | (H) |
| Tensile strength (kg/cm²) | 162 | 118 |
| 300% tensile modulus (kg/cm²) | 84 | 82 |
| Elongation (%) | 455 | 412 |
| Tear resistance (kg/cm) | 44 | 37 |
| Hardness (Hs JIS) | 58 | 54 |
| Resilience by RUPKE resilience tester (%) | 57 | 53 |
| Akron abrasion (cc/1000 times) | 0.04 | 0.08 |
| Flex-cracking by Demattia tester (times)* | 2660 | 2210 |

*According to ASTM-D-813-59.

As can be noted from the results shown in Table 13, the sample (G) obviously exhibits a superiority over the comparative sample (H) with regard to the fundamental physical properties such as the tensile strength, the tear resistance and the Akron abrasion.

We claim:

1. Process for producing rubbery polymer having desired degree of branching which comprises subjecting a member selected from the group consisting of a conjugated diene selected from 1,3-butadiene and 1,3-pentadiene and a mixture of said conjugated diene and a monovinyl substituted aromatic compound to a low temperature condition within a temperature range of −5°C. to below about 20°C. for from 1 to 5 hours in the presence of a catalyst consisting of an alkyllithium in a hydrocarbon diluent to initiate the reaction and to polymerize up to about 10 percent of said monomer, and thereafter subjecting the resulting reaction mixture to a polymerization temperature of from 40°C. to 80°C. to complete the polymerization reaction, thereby giving a polymer having desired branched structures.

2. Process according to claim 1, wherein the conjugated diene is 1,3-butadiene.

3. Process according to claim 1, wherein the conjugated diene is 1,3-pentadiene.

4. Process according to claim 1, wherein the conjugated diene is a mixture of said conjugated diene and a monovinyl substituted aromatic compound.

5. Process according to claim 1, wherein the conjugated diene is a mixture of 1,3-butadiene and styrene.

6. Process according to claim 1, wherein the monovinyl substituted aromatic compound is a member selected from the group consisting of styrene, 3-vinyltoluene, 4-ethylstyrene and 4-vinyltoluene.

7. Process according to claim 1, wherein the hydrocarbon diluent is a member selected from the group consisting of pentane, hexane, isobutane, isooctane, n-dodecane, cyclopentane, cyclohexane, methylcyclohexane, benzene, toluene, xylene and ethylbenzene.

8. Process according to claim 1, wherein the catalyst is selected from the group consisting of methyllithium, ethyllithium, propyllithium, n-butyllithium, sec-butyllithium, amyllithium, hexyllithium and 2-ethylhexyllithium.

9. Process according to claim 1, wherein the catalyst is n-butyllithium.

10. Process according to claim 1, wherein the catalyst is sec-butyllithium.

11. Process according to claim 1, wherein the conjugated diolefin is 1,3-butadiene and the catalyst is n-butyllithium.

12. Process according to claim 1, wherein the conjugated diolefin is 1,3-butadiene and the catalyst is sec-butyllithium.

13. Process according to claim 1, wherein the conjugated diene is a mixture of 1,3-butadiene and styrene and the catalyst is sec-butyllithium.

14. Process according to claim 6, wherein the conjugated diene is a mixture of 1,3-butadiene and styrene and the catalyst is n-butyllithium.

* * * * *

UNITED STATES PATENT AND TRADEMARK OFFICE
CERTIFICATE OF CORRECTION

PATENT NO. : 3,980,624
DATED : September 14, 1976
INVENTOR(S) : SABURO MINEKAWA et al It is certified that error appears in the above-identified patent and that said Letters Patent are hereby corrected as shown below:

Column 2, line 43: replace "fro" with --- for ---.

Column 7, line 43: replace "temperaure" with
--- temperature ---.

Column 11, line 67: replace "part" with --- parts ---.

Column 12, line 19: replace "Willims" with
--- Williams ---.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks